US010409658B2

(12) United States Patent
Broadhurst et al.

(10) Patent No.: US 10,409,658 B2
(45) Date of Patent: Sep. 10, 2019

(54) BATCH PROCESSING OF MESSAGES (71) Applicant: International Business Machines Corporation, Armonk, NY (US)

(72) Inventors: Peter A. Broadhurst, Hampshire (GB); John Hosie, Hampshire (GB); Robert B. Nicholson, Hampshire (GB); Robert W. Phippen, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 15/417,418

(22) Filed: Jan. 27, 2017

(65) Prior Publication Data
US 2018/0217882 A1 Aug. 2, 2018

(51) Int. Cl.
G06F 9/54 (2006.01)

(52) U.S. Cl.
CPC .................................. *G06F 9/546* (2013.01)

(58) Field of Classification Search
CPC combination set(s) only.
See application file for complete search history.

(56) References Cited

U.S. PATENT DOCUMENTS

| 6,529,932 | B1 | | 3/2003 | Dadiomov et al. |
| 7,155,483 | B1 | * | 12/2006 | Friend .................. H04W 28/06 709/206 |
| 8,489,693 | B2 | | 7/2013 | Eibach et al. |
| 8,584,124 | B2 | | 11/2013 | Fee et al. |
| 8,966,486 | B2 | | 2/2015 | Phan et al. |
| 2003/0163511 | A1 | * | 8/2003 | Smith ................... G06F 9/4843 718/101 |
| 2017/0013005 | A1 | * | 1/2017 | Galula ................ H04L 63/1425 |
| 2017/0064027 | A1 | * | 3/2017 | Grenader ............ H04L 67/2842 |
| 2017/0083396 | A1 | * | 3/2017 | Bishop .................... G06F 11/14 |
| 2017/0242889 | A1 | * | 8/2017 | Zhao ................ G06F 17/30457 |

OTHER PUBLICATIONS

Josh Long, Using Apache Kafka for Integration and Data Processing Pipelines with Spring, Apr. 15, 2015, 10 pages, URL: https://spring.io/blog/2015/04/15/using-apache-kafka-for-integration-and-data-processing-pipelines-with-spring.

(Continued)

*Primary Examiner* — Dong U Kim
(74) *Attorney, Agent, or Firm* — Schmeiser, Olsen & Watts, LLP; William Hartwell (57) ABSTRACT

A method and associated system. For each message of a message batch, the message is assigned by a consumer to a partition of a log. Each partition of the log is associated with a respective processing engine. The message batch includes messages that includes the message. The consumer stores an offset value for each partition. Responsive to completion, by a distributor, of sending a last message in the message batch to the consumer, the distributor ascertains a target offset value for each partition based on a current offset value. In response to a processing engine completing processing of a message assigned to the partition associated with the processing engine, the consumer updates the stored offset value associated with the partition. The distributor determines when all messages of the batch have been processed based on the target offset values and the stored offset values.

19 Claims, 5 Drawing Sheets

(56) References Cited

OTHER PUBLICATIONS

Bienvenido, David, Apache Kafka—A Different Kind of Messaging System, Dec. 16, 2013, 9 pages, URL: https://www.infoq.com/news/2013/12/apache-afka-messaging-system.

Broadhurst et al., Extending aggregation and collection of messages in WebSphere Message Brooker, Apr. 17, 2013, 14 pages, URL:http://www.ibm.com/developerworks/websphere/library/techarticles/1304_marie/1304_marie.html.

Broadhurst et al., Batch Processing, Cloud-Integration/architecture, 5 pages, Retrieved on Dec. 18, 2016, URL:https://github.ibm.com/Cloud-Integration/architecture/blob/f0b7f733f8c . . . .

* cited by examiner

BATCH PROCESSING OF MESSAGES

TECHNICAL FIELD

The present invention relates message processing, and in particular, relates to batch processing of messages in a processing environment.

BACKGROUND

Messaging, as discussed herein, may be considered as a method that allows entities to communicate by sending and receiving messages without requiring human interaction. An important aspect of messaging is its asynchronous nature which means that the sender of a message does not need to wait for the recipient to receive the information. Thus, sending applications can be free to generate messages at an appropriate speed, handling peak periods as they occur, without having to wait for recipients to deal with the requests.

It is known to process messages sequentially or in parallel, depending on the processing/execution environment for example. In a sequential execution environment, message requests are executed according to the original sequence of the message requests (e.g., in an environment where the target system has only a single processor for executing message requests). However, in a parallel execution environment (e.g., an environment where the target system has two or more processors), preservation of a particular message sequence cannot be guaranteed because the parallel execution system starts a new thread for each incoming message request and executes requests without regard to an intended order of the requests. As a result, the execution of two consecutive related requests may be transposed and cause an execution error.

SUMMARY

Embodiments of the present invention provide a method, and associated computer program product and data processing system.

For each message of a message batch, a consumer assigns the message to a partition of a log, wherein each partition of the log is associated with a respective processing engine, and wherein the message batch comprises a plurality of messages that includes the message. The consumer stores an offset value for each partition. Responsive to completion, by a distributor, of sending a last message in the message batch to the consumer, the distributor ascertains a target offset value for each partition, wherein ascertaining the target offset value for each partition is based on a current offset value. In response to a processing engine completing processing of a message assigned to the partition associated with the processing engine, the consumer updates the stored offset value associated with the partition. The distributor determiners when all messages of the batch have been processed based on the target offset values and the stored offset values.

BRIEF DESCRIPTION OF THE DRAWINGS

Embodiments of the present invention will now be described, by way of example only, with reference to the following drawings.

DETAILED DESCRIPTION

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer; i.e. is a computer-implementable method. The various steps of the method therefore reflect various parts of a computer program, e.g. various parts of one or more algorithms.

Also, in the context of the present application, a (processing) system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

A "distributor" is defined herein as a distributor computer, or a distributor computer system, whose functionality includes producing a message batch of messages and sending the batch of messages to a consumer. In one embodiment the distributor sends the batch of messages to the consumer via a messaging system.

A "consumer" is defined herein as a consumer computer, or a consumer computer system, whose functionality includes processing the message batch of messages produced by the distributor.

The distributor and the consumer are separated from each other and may be connected by a messaging system (e.g., a cloud-based messaging system). In one embodiment, the distributor comprises the messaging system. In one embodiment, the messaging system is a computer system that is separated from the distributor.

The consumer processes the batch of messages, in a parallel processing environment, via execution of processing engines. In one embodiment, the consumer comprises the processing engines. In one embodiment, execution of the processing engines to processes the batch of messages is implemented in a cloud-based server, wherein the consumer may comprise the cloud-based server or may be separated from cloud-based server.

In one embodiment, the messaging system is a messaging computer system that comprises the cloud-based server and is separated from both the distributor and the consumer.

A consideration for messaging methods may concern the execution of related requests in a parallel execution environment. For example, it may be required to coordinate a batch of work consisting of a large number of individual records of data across a highly-parallel stateless processing environment that is driven by asynchronous messaging.

A log, as discussed herein, may be thought of as a sequence of records, or messages, written to a persistent storage by any means that ensures the sequence of records may be reliably retrieved at a later point in time. Examples may include writing to a single local, or remote, file system that is made reliably retrievable through a redundant array of independent disks (RAID) configuration or clustering technologies. Alternatively records may be written to multiple remote instances of an application and made reliably retrievable through redundancy.

The illustrative embodiments provide a computer implemented method for determining when all messages of a message batch, produced by a distributor, have been processed by a consumer in a parallel processing environment. The method may include: for each message of the message batch, assigning the message to a partition of a log, wherein each partition of the log is associated with a respective processing engine; for each partition, storing an offset value; the distributor, responsive to completion, by the distributor, of sending a last message in the message batch to the consumer (e.g., via the messaging system) for subsequent processing by the consumer, ascertaining a target offset value for each partition based on a current offset value; the consumer, when a processing engine completes processing of a message assigned to the partition associated with the processing engine, modifying the stored offset value associated with the partition; and the distributor determining when all messages of the batch have been processed based on the target offset values and the stored offset values.

An embodiment of the present invention provides a method for use in a parallel processing environment, wherein the distributor captures a 'snapshot' of the current offset values associated with each partition of the log that may contain a message from the message batch. This snapshot may act as a high watermark for the distributor to use in determining when all of the messages of a message batch have been processed by a consumer.

Embodiments of the present invention may enable a data processing system to: for each message of the message batch, assign the message to a partition of a log, wherein each partition of the log is associated with a respective processing engine; for each partition, store an offset value; in response to completion, by the distributor, of sending a last message in the message batch to the consumer (e.g., via the messaging system) for subsequent processing by the consumer, ascertain a target offset value for each partition based on the stored offset values for the distributor; when a processing engine completes processing of a message assigned to the partition associated with the processing engine, modify the stored offset value associated with the partition for the consumer: and determine when all message of the batch have been processed based on the target offset values and the stored offset values. The step of determining when all messages of the message batch have been processed may include: obtaining the stored offset value of each partition associated with the consumer; comparing the stored offset value with the target offset value for each partition; and determining that all of the messages of the message batch have not been processed if the current stored offset value is less than the target offset value; or determining that all of the message of the message batch have been processed if the current stored offset value is greater than or equal to the target offset value.

Embodiments of the present invention provide a computer implemented method to determine when all messages of a message batch have been processed in a parallel processing environment by comparing the stored offset values, of the partitions of the log, to the target offset values captured by the message distributor upon sending the final message.

Embodiments of the present invention may enhance a cloud-based messaging system by enabling a message distributor to determine when all messages of a message batch have been processed by a consumer. Embodiments may enable a batch of messages to be processed in a parallel processing environment, while ascertaining a high watermark for the offset of each processing engine associated with the messages, in order to indicate when all of the messages have been processed, which may extend or improve the processing capabilities or efficiency of a cloud-based messaging system.

Modifications and additional steps to a traditional messaging system implementation enhance the value and utility of the embodiments present invention.

Illustrative embodiments may be utilized in many different types of distributed processing environments. In order to provide a context for the description of elements and functionality of the illustrative embodiments, the figures are provided hereafter as an example environment in which aspects of the illustrative embodiments may be implemented. It should be appreciated that the figures are only exemplary and not intended to assert or imply any limitation with regard to the environments in which aspects or embodiments of the present invention may be implemented. Many modifications to the depicted environments may be made without departing from the spirit and scope of the present invention.

Also, those of ordinary skill in the art will appreciate that the hardware and/or architectures in the Figures may vary depending on the implementation. Further, the processes of the illustrative embodiments may be applied to multiprocessor/server systems, other than those illustrated, without departing from the scope of the present invention.

Moreover, the system may take the form of any of a number of different processing devices including client computing devices, server computing devices, a tablet computer, laptop computer, telephone or other communication devices, personal digital assistants (PDAs), or the like. In some illustrative examples, a distributor and a consumer may comprise portable computing devices that are connected by a cloud-based messaging system, for example. Thus, the system may essentially be any known or later-developed processing system without architectural limitation.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
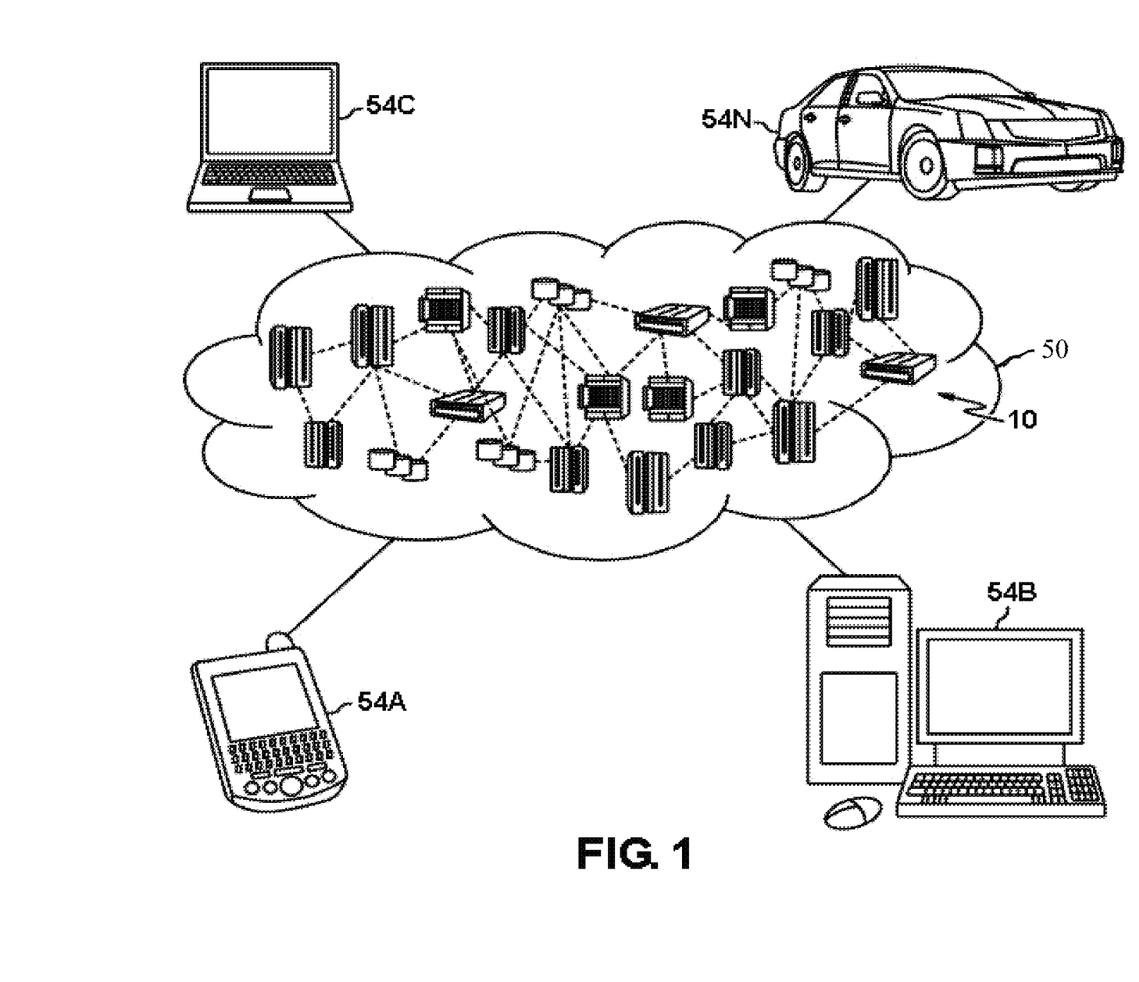
FIG. 1 depicts a cloud computing environment, in accordance with embodiments of the present invention.

FIG. 1 depicts a cloud computing environment 50, in accordance with embodiments of the present invention. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
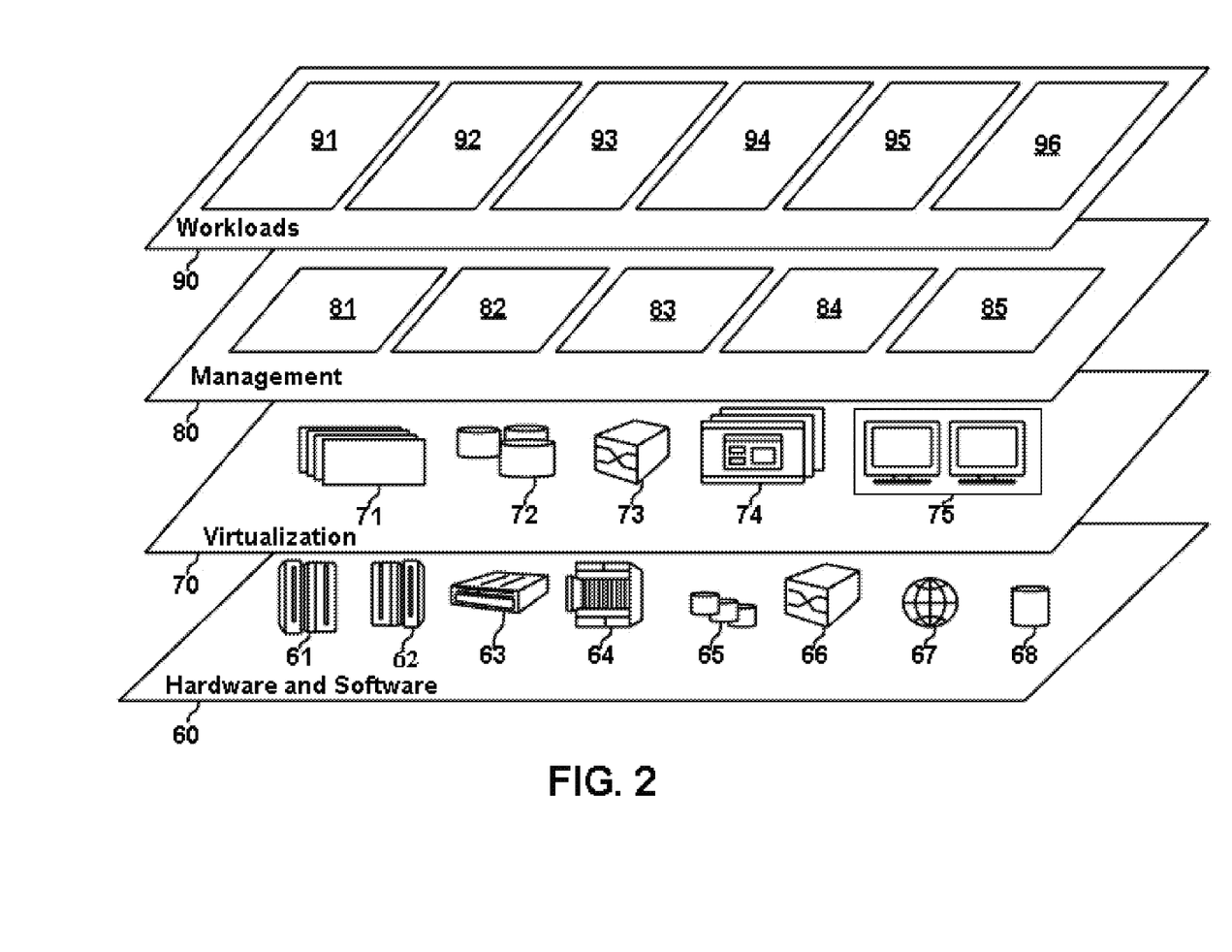
FIG. 2 depicts abstraction model layers, in accordance with embodiments of the present invention.

FIG. 2 depicts abstraction model layers, in accordance with embodiments of the present invention. Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and determining when all messages in a message batch, produced by a distributor, have been processed by a consumer 96.

Figure 3:
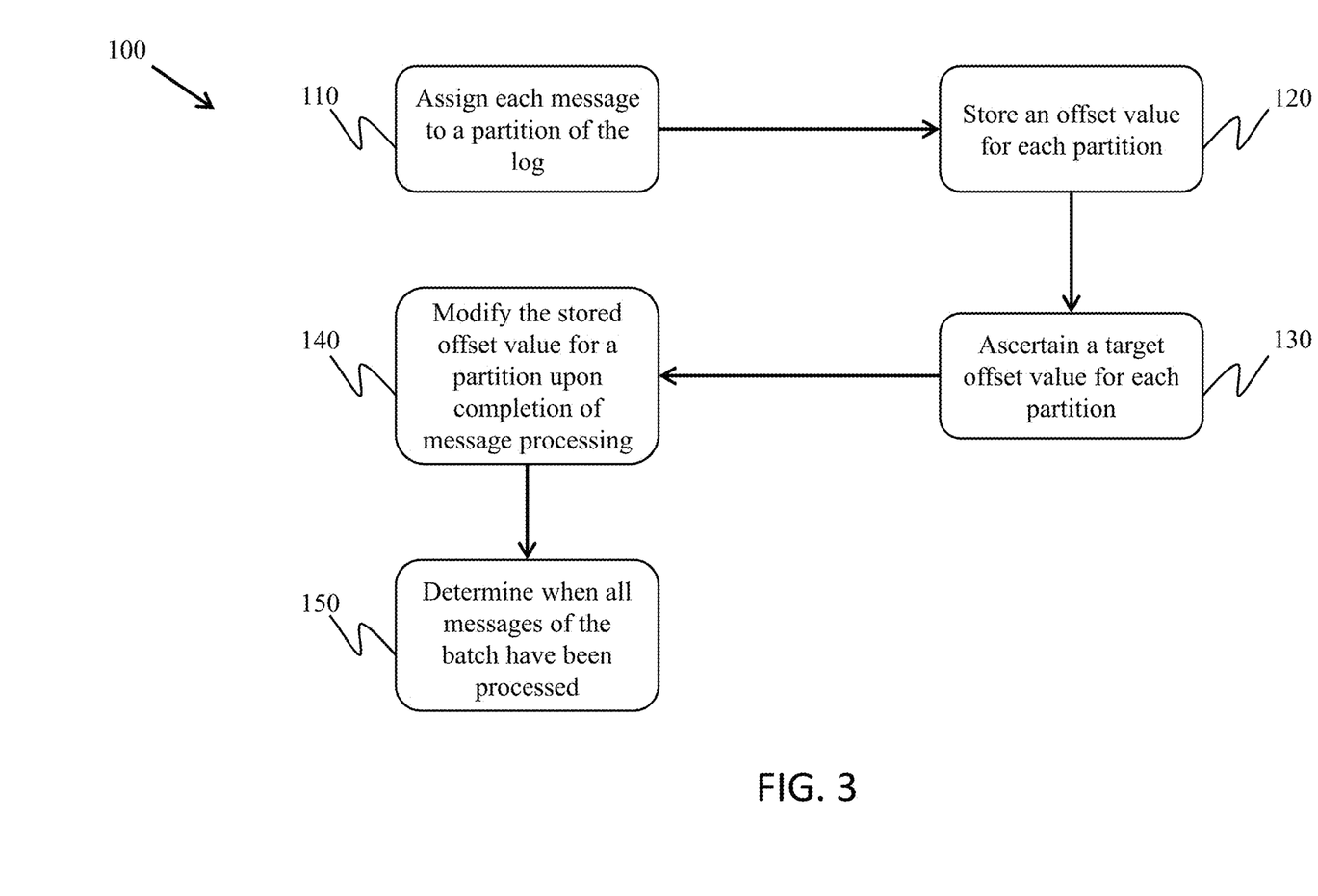
FIG. 3 depicts a method, in accordance with embodiments of the present invention.

FIG. 3 depicts a method 100, in accordance with embodiments of the present invention. The method 100 determines when all messages in a message batch, produced by a distributor, have been processed by a consumer in a parallel processing environment. The process may begin in step 110, wherein each message of the message batch may be assigned, by the consumer or the distributor, to a partition of a log, wherein each partition of the log may be associated with a respective processing engine. Step 110 may also set the offset value of each partition to the offset value's initial value (e.g., zero) and store the initial values of the offset in each partition within the consumer or in a computer system external to, and accessible by, the consumer.

A parallel processing environment, such as a cloud-based server, may contain a large number of partitions, each of which may be associated with a respective single processing engine. The messages from a message batch may be workload balanced across multiple partitions in order to achieve parallel message processing, which may allow for the parallel execution of the messages, greatly reducing the time required to process the message batch as a whole. In some cases, the log may comprise a distributed commit log, meaning that the log may be divided and distributed across the parallel processing environment. In some cases, the log may be used as a series of records, detailing previous messages that have been processed. In other or further examples, at least one processing engine may be implemented by a cloud-based server.

In step 120, an offset value may be stored for each partition by the consumer, in the consumer or in a computer system external to, and accessible by, the consumer (e.g., in the cloud-based server that comprises the processing engines). The offset of a partition may be associated with the number (n) of currently processed messages within that partition. In one embodiment, the offset of a partition is a monotonically increasing offset function f(n) of n.

In one embodiment, the offset function f(n) is defined recursively via $f(n+1)=Af(n)+B$, $f(0)=K$, wherein A, B and K are pre-defined (i.e., specified) constants, and wherein $A≥1$ and $B>0$. In one example for the preceding embodiment, the preceding offset function f(n) is an index value having a positive integer value, wherein A, B, and K are pre-defined constants having integer values such that $A≥1$, $B>0$, and $K≥0$. In another example for the preceding embodiment, $A=1$ (i.e., $f(n+1)=f(n)+B$). In another example for the preceding embodiment, $A=1$, $B=1$, and $K=0$ (i.e., $f(n)=n$). In one embodiment, the offset function is partition specific; i.e., the offset function differs for each partition.

In one embodiment, the offset function is partition independent; i.e., the same offset function is used for each partition.

In step 130, the distributor, responsive to, completion, by the distributor, of the last message in the message batch to the consumer (e.g., via the messaging system for subsequent processing by the consumer), may ascertain a target offset value for each partition as equal to a current offset value for each partition.

In this way, the distributor may capture a 'snapshot' of the offsets of each partition once all of the messages of the message batch have been sent by the distributor to the consumer (e.g., via the messaging system). This snapshot of target offset values may then act as a high watermark, against which the stored offset values of the consumer's partitions may be compared.

In a typical messaging system, a consumer may receive multiple messages simultaneously. As a result, it may not be possible to guarantee that a single message batch will be processed in the same order as the individual messages of the single message batch was sent by the distributor. By attaining a high watermark for the partitions, after the final message has been sent by the distributor to the consumer (e., via the messaging system), it may be possible for the consumer to simultaneously receive messages from other sources without preventing the distributor from being able to determine when all of the distributor's messages have been processed by the consumer.

In other words, the high watermark is the highest offset value of each partition, associated with the message batch, which must be reached in order to have processed all of the messages of the message batch. In this way, it may be possible to take into account messages that have been received by the consumer other than the messages of the message batch. The high watermark may be described by the target offset values, which may result in the distributor being able to determine when all of the messages of the message batch have been processed by the consumer. In some cases, the distributor may comprise a messaging system for distributing messages to a consumer system.

In another embodiment, the high watermark may be greater than the highest offset value associated with the message batch. In other words, the 'snapshot' of target offset values may be captured at any instant of time after the last message of the message batch has been sent by the distributor. In this case, the closer the instant of time is to the sending of the final message, the closer the target offset values, or high watermark, may be to the exact completion point of the processing of the message batch.

In some designs, step 130 may include: the distributor obtaining a current offset value for each partition; and assigning the current offset value as the target offset value for the consumer.

In other words, upon sending the final message of the message batch, the distributor may record the current offset values of each partition to act as target offset values for the consumer. When the stored offset values of the consumer's partitions are greater than or equal to the target offset values, it may be possible to determine that all of the messages of the message batch have been processed by the consumer.

In step 140, the consumer, when a processing engine completes processing of a message assigned to the partition associated with the processing engine, may update the stored offset value associated with the partition to reflect the completion of the processing of the message assigned to the partition associated with the processing engine. The updated offset value is stored, by the consumer, in the consumer or in a computer system external to, and accessible by, the consumer (e.g., in the cloud-based server that comprises the processing engines).

In some arrangements, the process of updating the stored offset value associated with the partition may comprise increasing the stored offset value by a predetermined amount B corresponding to the offset function f(n) satisfying the recursive relationship f(n+1)=f(n)+B.

By modifying the stored offset value, it may be possible to indicate when a message has been processed. This may then allow the distributor to monitor the consumer's progress in the processing of messages.

In step 150, the distributor may determine when all messages of the message batch have been processed based on the target offset values and the stored offset values. Step 150 may be implemented as a method of determining when all messages of the message batch have been processed, as described in FIG. 4.

In some cases the consumer may include a plurality of consumer entities. In this way, a distributor, such as a messaging system, may distribute a batch of messages to multiple consumers. The method described above may be used to determine when each consumer has completed the processing of all of the messages in the message batch. The consumers may choose to subscribe to the distributor in order to receive the message batch. For example, in a messaging system such as Apache Kafka, a consumer may subscribe to a certain Kafka Topic, which is a group of related partitions, related to a certain message distributor.

In an embodiment, the method 100 may further include: obtaining an index of each message, wherein the index is a monotonically increasing value based on the number of existing messages (n) within the associated partition; and ascertaining a target offset value for each partition based on the stored offset values and the index. In one embodiment, the preceding index is the index value discussed supra namely the offset function f(n) is defined recursively via f(n+1)=Af(n)+B, f(0)=K, wherein A, B, and K are predefined constants having integer values such that A≥1, B>0, and K≥0. In this way, it may be possible to know the exact position of each message in each partition of the log. This may then be used to improve the accuracy of the target offset values, acting as a high watermark, in order to further reduce the delay between the consumer completing the processing and the distributor being informed of this completion.

The method 100 may allow for a reduction in the processing power required to operate a distributed, for example cloud-based, messaging system as each processing engine associated with each partition of the log is only required to record each processing engine's own offset value. These offset values may then be used by the distributor in order to determine when all of the messages of the message batch have been processed by a consumer.

Figure 4:
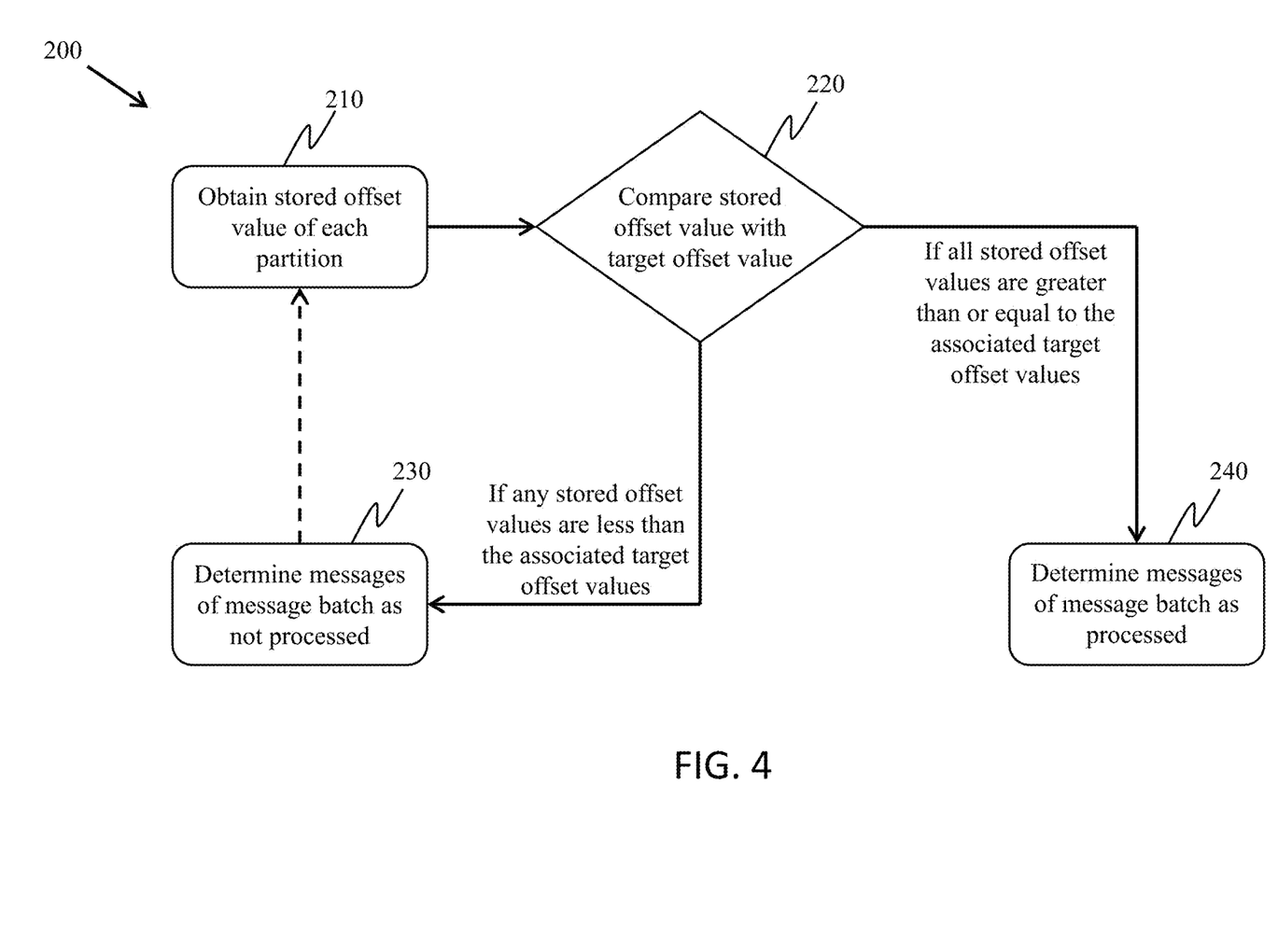
FIG. 4 depicts an embodiment of a method of the present invention.

FIG. 4 depicts an embodiment of a method 200, in accordance with embodiments of the present invention. The method 200 implements step 150 of FIG. 3 by determining when all messages of the message batch have been processed. The method 200 may begin in step 210, wherein the distributor may obtain the stored offset value of each partition associated with the consumer. In an arrangement, the stored offset value may be obtained using an Application Programming Interface, API.

By obtaining the stored offset values of each partition associated with the consumer, it may be possible for the distributor to assess how many messages the consumer has processed. In other words, the stored offset values may provide an indication of the current state of the consumer to the distributor.

In some embodiments, the step 210 may comprise: polling the consumer, by the distributor via the messaging system, for the offset value of each partition; and storing the returned value. The consumer may provide, to the distributor, the offset value of each partition by accessing and retrieving the stored value of each partition from where the offset was previously stored by the consumer (i.e., from within the consumer or from a computer system external to, and accessible by, the consumer such as, for example, the cloud-based server).

In some cases, the polling may be performed manually by a user of the messaging system, or it may be performed automatically by the messaging system itself at predetermined intervals. Polling the offset values of a partition may return the current offset value of that partition, thereby storing the most recently updated offset value for use in the method 200. By performing regular offset polling it may be possible to improve the accuracy of the target offset values, thereby reducing the delay between a consumer processing all of the messages and the distributor determining that all of the messages have been processed. The frequency of the offset polling may be adjusted to match the processing cycles of the processing engines associated with the log partitions.

Step 220 compares the stored offset value with the target offset value for each partition.

If step 220 determines that any of the stored offset values are less than the target offset values, the method progresses to step 230, wherein it is determined that all of the messages of a message batch have not been processed.

In other words, if the stored offset values are less than the target offset values, the distributor may determine that the consumer has not yet processed the entire message batch. Put another way, the consumer is indicated as being below the high watermark set by the target offset values.

It may then be possible for the method to then return to step 210 in order to obtain the most recent stored offset value for each partition. In this way, the method may continually check the updated stored offset values against the target offset values, until the stored offset values are found to be greater than or equal to the target offset values.

If step 220 determines that all of the stored offset values are equal to or greater than the associated target offset values, then the method progresses to step 240. In step 240, it is determined that all of the messages of the message batch have been processed.

Put another way, when the consumer is indicated as being at or above the high watermark, set by the target offset values, the distributor may be assured that all of the messages in the message batch have been processed by the consumer.

Figure 5:
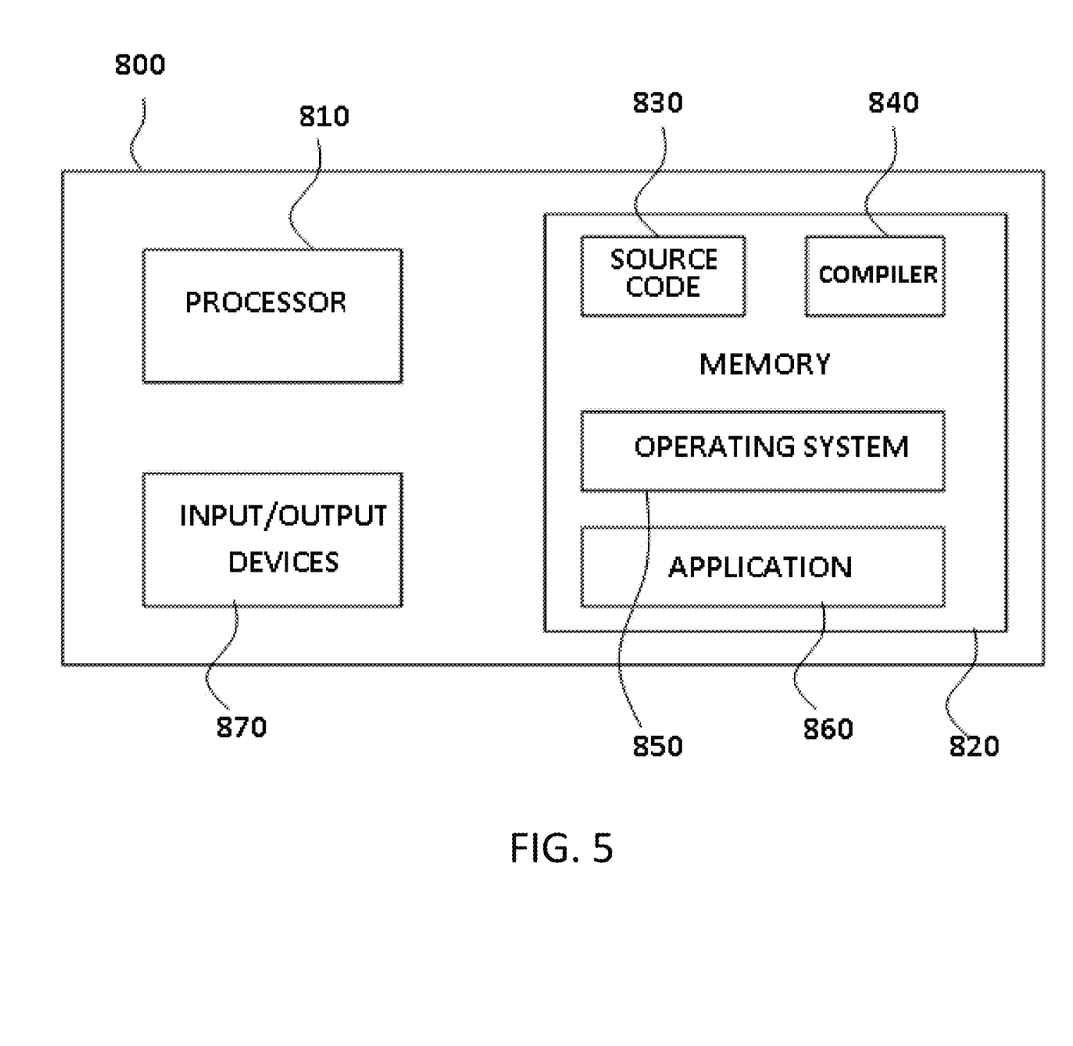
FIG. 5 illustrates an example of a computer system within which one or more embodiments of the present invention may be implemented.

FIG. 5 illustrates an example of a computer system 800 within which one or more embodiments of the present invention may be implemented. Various operations discussed above may utilize the capabilities of the computer system 800. For example, one or more parts of a system for determining when all messages of the message batch have been processed based on the target offset values and the stored offset values may be incorporated in any element, module, application, and/or component discussed herein.

The computer system 800 includes, but is not limited to, PCs, workstations, laptops, PDAs, palm devices, servers, storages, and the like. Generally, in terms of hardware architecture, the computer system 800 may include one or more processors 810, memory 820, and one or more I/O devices 870 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 810 is a hardware device for executing software that can be stored in the memory 820. The processor 810 can be virtually any custom made or commercially available processor, a central processing unit (CPU), a digital signal processor (DSP), or an auxiliary processor among several processors associated with the computer system 800, and the processor 810 may be a semiconductor based microprocessor (in the form of a microchip) or a microprocessor.

The memory 820 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 820 may incorporate electronic, magnetic, optical, and/or other types of storage media. Note that the memory 820 can have a distributed architecture, where various components are situated remote from one another, but can be accessed by the processor 810.

The software in the memory 820 may include one or more separate programs, each of which comprises an ordered listing of executable instructions for implementing logical functions. The software in the memory 820 includes a suitable operating system (O/S) 850, compiler 840, source code 830, and one or more applications 860 in accordance with exemplary embodiments. As illustrated, the application 860 comprises numerous functional components for implementing the features and operations of the exemplary embodiments. The application 860 of the computer system 800 may represent various applications, computational units, logic, functional units, processes, operations, virtual entities, and/or modules in accordance with exemplary embodiments, but the application 860 is not meant to be a limitation.

The operating system 850 controls the execution of other computer programs, and provides scheduling, input-output control, file and data management, memory management, and communication control and related services. It is contemplated by the inventors that the application 860 for implementing exemplary embodiments may be applicable on all commercially available operating systems.

Application 860 may be a source program, executable program (object code), script, or any other entity comprising a set of instructions to be performed. When a source program, then the program is usually translated via a compiler (such as the compiler 840), assembler, interpreter, or the like, which may or may not be included within the memory 820, so as to operate properly in connection with the O/S 850. The I/O devices 870 may include input devices such as, for example but not limited to, a mouse, keyboard, scanner, microphone, camera, etc. Furthermore, the I/O devices 870 may also include output devices, for example but not limited to a printer, display, etc. Finally, the I/O devices 870 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 870 also include components for communicating over various networks, such as the Internet or intranet.

If the computer 800 is a PC, workstation, intelligent device or the like, the software in the memory 820 may further include a basic input output system (BIOS) (omitted for simplicity). The BIOS is a set of essential software routines that initialize and test hardware at startup, start the O/S 850, and support the transfer of data among the hardware devices. The BIOS is stored in some type of read-only-memory, such as ROM, PROM, EPROM, EEPROM or the like, so that the BIOS can be executed when the computer 800 is activated.

When the computer 800 is in operation, the processor 810 is configured to execute software stored within the memory 820, to communicate data to and from the memory 820, and to generally control operations of the computer 800 pursuant to the software. The application 860 and the O/S 850 are read, in whole or in part, by the processor 810, perhaps buffered within the processor 810, and then executed.

When the application 860 is implemented in software it should be noted that the application 860 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 860 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In one embodiment, the system of the present invention may be or include a hardware device such as a computer, portable device, etc. In one embodiment, the hardware device is or includes a special-purpose device (e.g., computer, machine, portable device) that comprises specialized, non-generic hardware and circuitry (i.e., specialized discrete non-generic analog, digital, and logic based circuitry) for (independently or in combination) particularized for executing only methods of the present invention. The specialized discrete non-generic analog, digital, and logic based circuitry may include proprietary specially designed components (e.g., a specialized integrated circuit, such as for example an Application Specific Integrated Circuit (ASIC), designed for only implementing methods of the present invention).

A computer program product of the present invention may include one or more computer readable hardware storage devices having computer readable program code stored therein, said program code containing instructions executable by one or more processors of a data processing system (or computer system) to implement the methods of the present invention.

A data processing system (or computer system) of the present invention may include one or more processors, one or more memories, and one or more computer readable hardware storage devices, said one or more hardware storage devices containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, said method comprising:
producing, by a distributor, a message batch of messages to be sent, by the distributor, to a consumer for being processed by the consumer, wherein each message in the message batch is assigned to a partition of a log, wherein each partition is associated with a respective processing engine configured to process, for the consumer, the messages assigned to each partition, wherein a currently stored offset value for each partition is a monotonically increasing offset function $f(n)$ of a number $(n)$ of currently processed messages in each partition, and wherein the currently stored offset value for each partition is dynamically updated as each message in each partition is processed by the respective processing engine;
responsive to completion, by the distributor, of sending a last message in the message batch to the consumer, ascertaining, by the distributor, a target offset value for each partition, said target offset value for each partition being a high watermark against which the currently stored offset values for each partition may be compared to determine whether all of the currently stored offset values for each partition have been processed; and
determining; by the distributor, when all messages of the message batch have been processed based on the target offset values and the currently stored offset values.

2. The method of claim 1, wherein said determining when all messages of the message batch have been processed comprises:
obtaining the currently stored offset value of each partition;
comparing the currently stored offset value with the target offset value for each partition; and
determining that all of the messages of the message batch have not been processed if the currently stored offset value is less than the target offset value for at least one of the partitions or determining that all of the messages of the message batch have been processed if the currently stored offset value is greater than or equal to the target offset value for all of the partitions.

3. The method of claim 2, wherein said obtaining the currently stored offset value for each partition comprises:
polling the consumer for the currently stored offset value of each partition; and
storing the offset value returned from said polling.

4. The method as claimed of claim 1, wherein the consumer comprises a plurality of consumer entities.

5. The method of claim 1, wherein said obtaining the currently stored offset value of each partition is implemented using an Application Programming Interface, API.

6. The method of claim 1, wherein the log comprises a distributed commit log.

7. The method of claim 1, wherein at least one processing engine of the respective processing engines is implemented by a cloud-based server.

8. The method of claim 1, wherein $f(n)$ is defined recursively via $f(n+1)=Af(n)+B$ for $n=0, 1, \ldots, N-1$, wherein $f(0)=K$, wherein N is a total number of messages assigned to each partition, and wherein A, B, and K are pre-defined constants having integer values such that $A \geq 1$, $B>0$, and $K \geq 0$.

9. The method of claim 1, wherein for each partition, the high watermark is the offset function $f(N)$ evaluated at the total number (N) of messages assigned to each partition.

10. A computer program product, comprising one or more computer readable hardware storage devices having computer readable program code stored therein, said program code containing instructions executable by one or more processors of a data processing system to implement a method, said method comprising:
producing, by a distributor, a message batch of messages to be sent, by the distributor, to a consumer for being processed by the consumer, wherein each message in the message batch is assigned to a partition of a log, wherein each partition is associated with a respective processing engine configured to process, for the consumer, the messages assigned to each partition, wherein a currently stored offset value for each partition is a monotonically increasing offset function $f(n)$ of a number $(n)$ of currently processed messages in each partition, and wherein the currently stored offset value for each partition is dynamically updated as each message in each partition is processed by the respective processing engine;
responsive to completion, by the distributor, of sending a last message in the message batch to the consumer, ascertaining, by the distributor, a target offset value for each partition, said target offset value for each partition being a high watermark against which the currently stored offset values for each partition may be compared to determine whether all of the currently stored offset values for each partition have been processed; and
determining, by the distributor, when all messages of the message batch have been processed based on the target offset values and the currently stored offset values.

11. The computer program product of claim 10, wherein said determining when all messages of the message batch have been processed comprises:
obtaining the currently stored offset value of each partition;
comparing the currently stored offset value with the target offset value for each partition; and
determining that all of the messages of the message batch have not been processed if the currently stored offset value is less than the target offset value for at least one of the partitions or determining that all of the messages of the message batch have been processed if the currently stored offset value is greater than or equal to the target offset value for all of the partitions.

12. The computer program product of claim 11, wherein said obtaining the currently stored offset value for each partition comprises:
polling the consumer for the currently stored offset value of each partition; and
storing the offset value returned from said polling.

13. The computer program product of claim 10, wherein $f(n)$ is defined recursively via $f(n+1)=Af(n)+B$ for $n=0, 1, \ldots, N-1$, wherein $f(0)=K$, wherein N is a total number of messages assigned to each partition, and wherein A, B, and K are pre-defined constants having integer values such that A≥1, B>0, and K≥0.

14. The computer program product of claim 10, wherein for each partition, the high watermark is the offset function f(N) evaluated at the total number (N) of messages assigned to each partition.

15. A data processing system, comprising one or more processors, one or more memories, and one or more computer readable hardware storage devices, said one or more hardware storage device containing program code executable by the one or more processors via the one or more memories to implement a method, said method comprising:

producing, by a distributor, a message batch of messages to be sent, by the distributor, to a consumer for being processed by the consumer, wherein each message in the message batch is assigned to a partition of a log, wherein each partition is associated with a respective processing engine configured to process, for the consumer, the messages assigned to each partition, wherein a currently stored offset value for each partition is a monotonically increasing offset function f(n) of a number (n) of currently processed messages in each partition, and wherein the currently stored offset value for each partition is dynamically updated as each message in each partition is processed by the respective processing engine;

responsive to completion, by the distributor, of sending a last message in the message batch to the consumer, ascertaining, by the distributor, a target offset value for each partition, said target offset value for each partition being a high watermark against which the currently stored offset values for each partition may be compared to determine whether all of the currently stored offset values for each partition have been processed; and determining, by the distributor, when all messages of the message batch have been processed based on the target offset values and the currently stored offset values.

16. The data processing system of claim 15, wherein said determining when all messages of the message batch have been processed comprises:

obtaining the currently stored offset value of each partition;

comparing the currently stored offset value with the target offset value for each partition; and determining that all of the messages of the message batch have not been processed if the currently stored offset value is les than the target offset value for at leak one of the partitions or determining that all of the messages of the message batch have been processed if the currently stored offset value is greater than or equal to the target offset value for all of the partitions.

17. The data processing system of claim 16, wherein said obtaining the currently stored offset value for each partition comprises:

polling the consumer for the currently stored offset value of each partition; and storing the offset value returned from said polling.

18. The data processing system of claim 15, wherein f(n) is defined recursively via f(n+1)=Af(n)+B for n=0, 1, ..., N−1, wherein f(0)=K, wherein N is a total number of messages assigned to each partition, and wherein A, B, and K are pre-defined constants having integer values such that A≥1, B>0, and K≥0.

19. The data processing system of claim 15, wherein for each partition, the high watermark is the offset function f(N) evaluated at the total number (N) of messages assigned to each partition.

* * * * *